US005406152A

United States Patent [19]

Fechner et al.

[11] Patent Number: 5,406,152

[45] Date of Patent: Apr. 11, 1995

[54] ELECTROMAGNETIC VIBRATION GENERATOR

[75] Inventors: Gerd Fechner, Birenbach; Bernhard Schreiner, Kirchheim; Wolfgang Steuer, Stuttgart, all of Germany

[73] Assignee: Licentia Patent-Verwaltungs-GmbH, Frankfurt, Germany

[21] Appl. No.: 799,829

[22] Filed: Nov. 27, 1991

[30] Foreign Application Priority Data

Nov. 29, 1990 [DE] Germany ........................ 40 37 994.9

[51] Int. Cl.[6] ............................................ H02K 35/00

[52] U.S. Cl. ........................................ 310/15; 310/16; 310/17; 310/29; 310/81; 310/181

[58] Field of Search ........................ 310/15, 16, 89, 91, 310/17, 20, 43, 90.5, 81, 82, 29, 181, 64, 65; 248/901; 128/24 R, 44, 50, 51; 335/272; 62/6; 60/520; 360/105

[56] References Cited

U.S. PATENT DOCUMENTS

| | | | |
|---|---|---|---|
| 3,130,333 | 4/1964 | Freye | 310/29 |
| 3,167,670 | 1/1965 | Spurlin | 310/29 |
| 3,277,394 | 10/1966 | Holt | 310/16 U X |
| 3,312,841 | 4/1967 | Makino | 310/15 U X |
| 3,345,525 | 10/1967 | MacBlane | 310/15 U X |
| 3,764,834 | 10/1973 | Brosch et al. | |
| 4,074,154 | 2/1978 | Kuschel | |
| 4,680,492 | 7/1987 | Tamura | 310/15 |
| 4,950,931 | 8/1990 | Goldenberg | 310/15 |
| 4,968,224 | 11/1990 | Hashimoto | 310/17 |
| 4,994,698 | 2/1991 | Kliman | 310/81 |

FOREIGN PATENT DOCUMENTS

| | | | |
|---|---|---|---|
| 1106103 | 5/1961 | Germany | 310/81 |
| 2115233 | 9/1983 | United Kingdom | |

*Primary Examiner*—R. Skudy
*Attorney, Agent, or Firm*—Spencer, Frank & Schneider

[57] ABSTRACT

An electromagnetic vibration generator includes a housing, a U-shaped magnet core disposed in the housing and having parallel-extending legs each terminating in a pole face, and an excitation winding inserted on each core leg. The magnet core is encased in cast resin in the housing. The vibration generator further has an armature adapted to be vibrated by an excitation current flowing through the excitation winding. The armature is separated from the pole faces by an air gap. Arrangements are provided for reducing effects of heat expansion of components of the vibration generator on the air gap width.

7 Claims, 1 Drawing Sheet

ELECTROMAGNETIC VIBRATION GENERATOR

BACKGROUND OF THE INVENTION

The present invention relates to an electromagnetic vibration generator including an electromagnet made of a U-shaped magnetic core and an excitation winding encased in cast resin in a housing and an armature which faces the pole faces of the magnetic core at a distance constituted by an air gap and which vibrates with a predetermined amplitude.

An electromagnetic vibration generator of the above-outlined type is disclosed in German Patent No. 1,106,103. Such electromagnetic vibration generators are used in various configurations as magnetic vibrators for driving vibratory conveyor troughs for bulk materials and small pieces as well as for driving screens, separators or dosaging devices.

Electromagnetic vibration generators constitute a vibratory system composed of two masses in which the magnet system and the armature vibrate in opposite directions relative to one another. The magnet system and the armature are generally coupled together by means of springs. While the vibration generator is generally excited at the single or double mains frequency, deviations from these driving frequencies are feasible for special applications.

While in earlier prior art systems, the electromagnet has been fastened to a supporting member, for example a housing, with the aid of fastening straps or bolts, in more current designs the electromagnet, that is, the U-shaped magnetic core and its excitation winding, has been encased in resin cast in a housing. Such a solution not only increases the electrical insulation and reduces the weight of the magnetic components, but also considerably saves manufacturing costs.

The air gap defined between the armature and the pole faces in the de-energized state must be of such a dimension that during operation (that is, the energized state) the armature vibrates within the air gap at an amplitude which is less than the width of the air gap. Only this measure can prevent the electromagnet and the armature from striking one another which would destroy the drive system.

While thus, on the one hand, the air gap must be sufficiently wide so that a collision between the electromagnet and the armature is reliably avoided, it is, on the other hand, a desideratum to maintain the air gap small to thus maintain the required inductive magnetization current as small as possible which is desirable with respect to current loads and the design of the mains device. The air gap at rest should thus expediently be dimensioned such that both requirements, that is, the avoidance of striking contact between the vibrating components and the lowest possible power consumption from the mains device are met. Since, moreover, the natural frequency and thus the vibration amplitude also change as a function of the weight of the load—in a conveyor, for example, the material being conveyed—electromagnetic vibratory drives are operated with a controlled supply voltage so as to be able to compensate at least for changes in the weight of the load.

It is an additional problem encountered in prior art constructions that the components and materials of the magnetic system change in volume and geometry in dependence on the temperature. For example, the cast resins employed have a higher coefficient of expansion than steel or even the frequently employed gray cast iron housing. Further, it has to be taken into consideration that the housing is fastened by brackets to a supporting element, and thus the temperature-caused changes in the brackets and in the supporting structure may also result in a change of the air gap dimension. Thus, the thermal expansion that occurs at the operating temperature of the device must also be considered when dimensioning the air gap. This, however, increases the inductive load current in the cold state.

SUMMARY OF THE INVENTION

It is an object of the present invention to provide an improved vibration generator of the above-mentioned type in which temperature changes have substantially no effect on the width of the air gap.

This object and others to become apparent as the specification progresses, are accomplished by the invention, according to which, briefly stated, the structural components of the vibration generator which could have an effect on the air gap width due to thermal expansion as a result of changes in temperature are of such a structural configuration and are arranged and fastened in the housing in such a manner that their influence on the width of air gap is slight.

It is a particular advantage of the invention that the structure and the selection of material substantially eliminate from the start any temperature influences on the air gap so that the air gap at rest can be selected smaller than in the prior art vibration generators, and in some instances the costs for regulating and operating the vibration generator are also reduced.

DESCRIPTION OF THE PREFERRED EMBODIMENT

Figure 1:
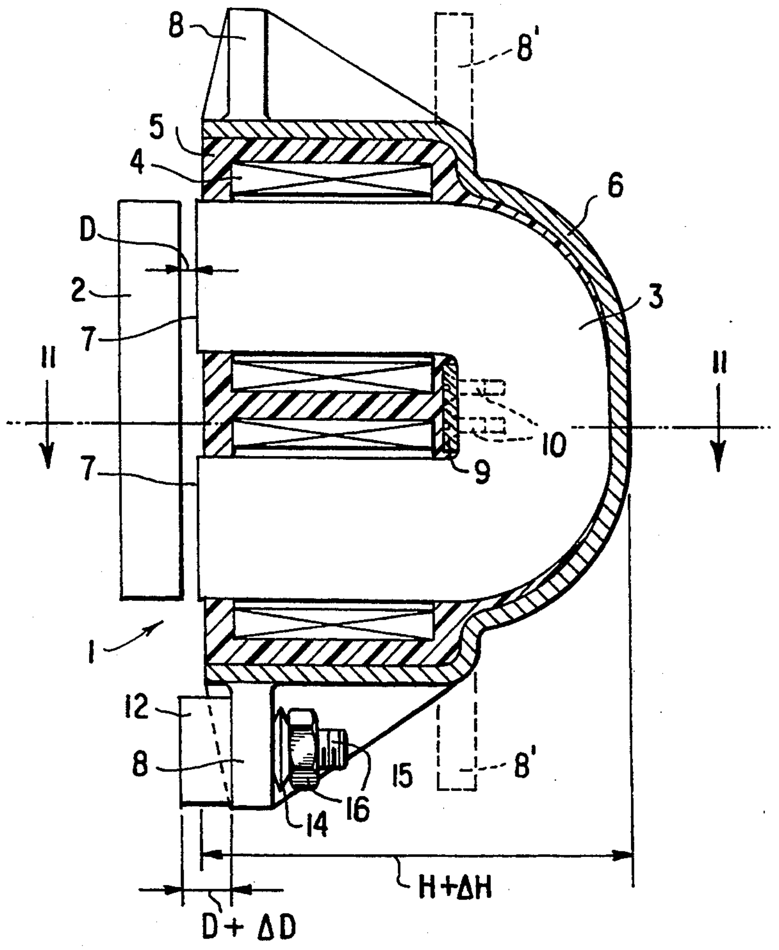
FIG. 1 is a schematic sectional side elevational view of a magnet system according to a preferred embodiment of the invention.
Figure 2:
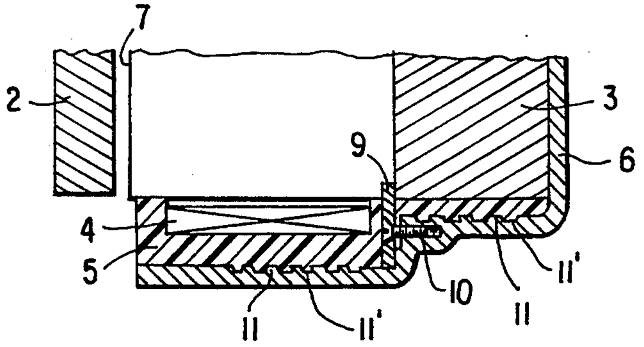
FIG. 2 is a fragmentary sectional view taken along line II—II of FIG. 1.

Turning to FIGS. 1 and 2, the magnet system 1 shown therein is composed of an electromagnet and an armature 2. The electromagnet has a U-shaped magnetic core 3 which is provided with an excitation winding 4. The magnetic core 3 and the excitation winding 4 are held in a gray cast iron housing 6 in a bed of cast resin 5.

Figure 3:
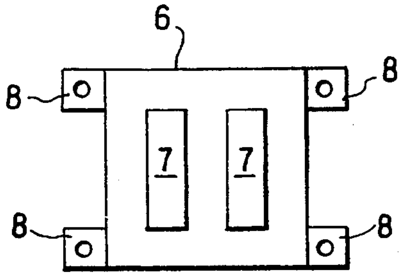
FIG. 3 is a front elevational view of the preferred embodiment, shown without an armature.

The armature 2 is disposed opposite the pole faces 7 of the magnetic core 3 at a predetermined distance which is constituted by an air gap having a width D in the de-energized state of the magnet system 1. When the vibration generator operates, the armature 2 vibrates in a direction perpendicular to the pole faces at a predetermined amplitude (not shown). As illustrated in FIGS. 1 and 3, the housing 6 of the electromagnet is fastened by way of brackets 8 to a supporting structure (not shown). In FIG. 1 the height of the housing 6 measured from the external bottom face of the housing 6 to the pole faces 7 is designated at H. In the prior art embodiments, the brackets 8' shown in dashed lines are disposed towards the bottom of the housing 6 remote from the pole faces 7. Consequently, if there is an increase in the operating temperature of the vibration generator, the housing expands by $\Delta H$ which means that the air gap width D is reduced by this value.

In order to prevent the armature and magnet system from striking one another in the prior art system having the conventional arrangement of brackets 8', the air gap would have to be widened corresponding to the change in length ΔH. The influence on the expansion of the housing on the air gap width can be avoided in that bracket 8 is attached, according to the present invention, to a neutral location of the housing 6, that is, as close as possible to the pole faces 7 of the magnetic core 3. As a result, an increase in the height H of the housing 6 has no influence on the width of the air gap.

In prior art arrangements, at an elevated temperature, the substantial expansion of the cast resin pushes the poles further outwardly of the housing toward the armature 2 and thus the air gap is again reduced. This effect can be avoided according to the invention by connecting the magnetic core with the housing by rigid webs in addition to the cast resin encasement. Or, as shown in FIG. 2, the magnet core 3 is tightened to an inside shoulder of the housing 6 by pressure plates 9 (only one is shown) each held in the housing 6 by a tightening screw 10. The pressure plates 9 compress the core laminae. These measures for affixing the core 3 to the housing 6 may be combined with the above-described positioning of the brackets 8.

Another possibility to keep the temperature influence of the cast resin low is to provide a series of alternating projections 11 and grooves 11' on the interior of housing 6 so as to achieve an anchoring connection between the cast resin 5 and the housing 6 to thus substantially prevent the poles from moving outwardly from the housing 6. Such a measure may be provided by itself or, as shown in FIG. 2, in combination with the pressure plates 9, and/or in combination with the particular positioning of the brackets 8, as described in connection with FIG. 1.

For further reducing the effect of temperature on a narrowing of the gap width D, each bracket 8 may be provided, as part of the fastening arrangement for the magnet system, with a cylindrical or cuboid expansion element 12 through which a screw 15 passes. The bracket face opposite the expansion element 12 is in engagement with spring washers 14. For fastening the housing 6, nuts 16 (only one shown) are used which are threaded on the screw 15. The expansion elements 12 are so dimensioned that a temperature-caused change in the air gap by −ΔD is compensated by a corresponding amount +ΔD.

It will be understood that the above description of the present invention is susceptible to various modifications, changes and adaptations, and the same are intended to be comprehended within the meaning and range of equivalents of the appended claims.

What is claimed is:

1. In an electromagnetic vibration generator including a housing, a U-shaped magnet core disposed in said housing and having parallel-extending legs each terminating in a pole face, an excitation winding inserted on each core leg, said magnet core being encased in cast resin in said housing, an armature adapted to be vibrated by an excitation current flowing through the excitation winding, said armature being separated from the pole faces by an air gap having a width; the improvement comprising means for reducing effects of thermal expansion of components of the vibration generator on the width of the air gap.

2. An electromagnetic vibration generator as defined in claim 1, wherein said means comprises brackets secured to said housing at locations neutral to thermal expansion.

3. An electromagnetic vibration generator as defined in claim 1, wherein said means comprises brackets secured to said housing at locations close to said pole faces.

4. An electromagnetic vibration generator as defined in claim 1, wherein said means comprises metal securing members rigidly connecting said core to said housing.

5. An electromagnetic vibration generator as defined in claim 4, wherein said metal securing members comprise pressure plates pressing said core against said housing.

6. An electromagnetic vibration generator as defined in claim 5, further comprising tightening screws affixing said pressure plates to said housing.

7. An electromagnetic vibration generator as defined in claim 1, wherein said means comprises projections separated by grooves and extending from an inner face of the housing into said cast resin.

* * * * *